(No Model.)
J. H. HAMILTON.
WATER CLOSET.
No. 453,809. Patented June 9, 1891.
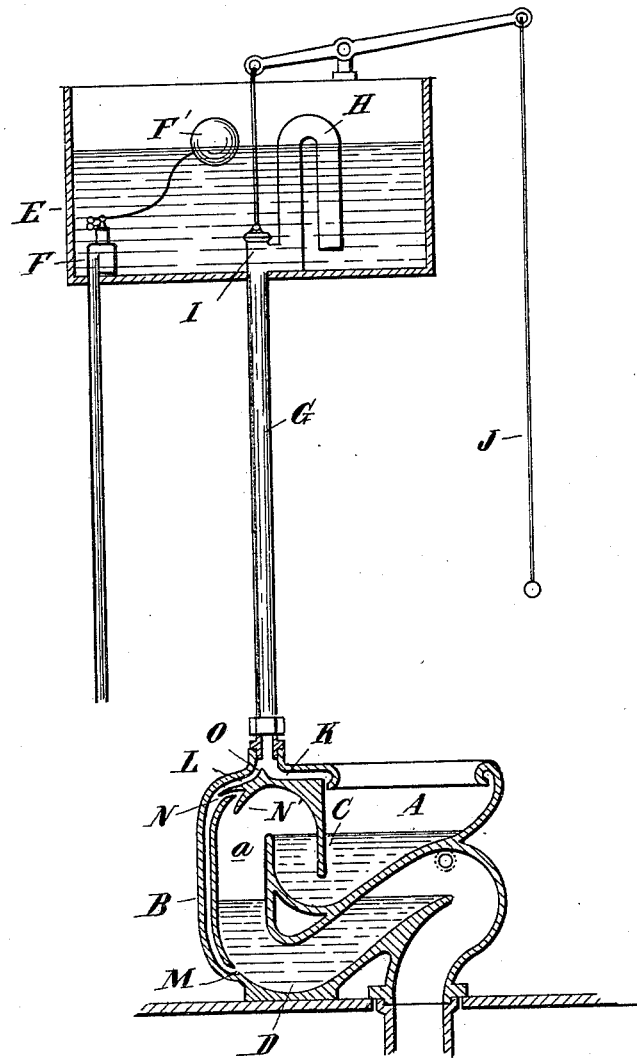
Witnesses
M. B. O'Dogherty
P. M. Hulbert
Inventor
John H. Hamilton
By Thos. H. Sprague & Son
Atty.
THE NORRIS PETERS CO., PHOTO-LITHO., WASHINGTON, D. C.

UNITED STATES PATENT OFFICE.

JOHN H. HAMILTON, OF DETROIT, MICHIGAN.

WATER-CLOSET.

SPECIFICATION forming part of Letters Patent No. 453,809, dated June 9, 1891.

Application filed December 30, 1890. Serial No. 376,294. (No model.)

*To all whom it may concern:*

Be it known that I, JOHN H. HAMILTON, a citizen of the United States, residing at Detroit, in the county of Wayne and State of Michigan, have invented certain new and useful Improvements in Water-Closets, of which the following is a specification, reference being had therein to the accompanying drawing.

This invention relates to new and useful improvements in siphon water-closets; and the invention consists in the peculiar construction and arrangement of the flushing device for operating the double trap or siphon water-closets to produce the requisite vacuum by causing a portion of the falling flushing-water to lower the level of the water in the lower trap, all as more fully hereinafter described, and shown in the accompanying drawing, in which I show a water-closet of the kind described embodying my improvement.

A is the bowl, B the soil-pipe leading therefrom and forming the trap C and D with the intervening air-space.

E is the flushing-tank supplied with water through a valve F, which is controlled by the float F' to keep the tank normally filled to the level indicated.

G is the flushing-pipe, which leads from the tank to the bowl, and is provided within the tank with the usual siphon H and the valve I near the bottom of the siphon for starting the siphon by means of the usual pull J and intermediate connection, all as of the usual construction. The lower end of this flushing-pipe connects with two separate water ways or passages K and L, which are in open communication with said water-pipe, one of the passages leading into the rim of the bowl or other flushing means with which the bowl may be provided and the other passage L, following the wall of the pipe B in a downward direction, opens into the lower trap D through an aperture M. This passage L also preferably communicates near its upper end, through similar opening N, with the air-space $a$ between the two traps.

O is a deflecting projection below the lower end of the flushing-pipe G, between the passages L and K.

In practice, the parts being arranged and constructed substantially as shown and described, they are intended to operate as follows: Upon pulling the cord J the siphon H is started in the usual manner and the water in falling down through the flushing-pipe G is divided, one part being conducted through the passage K to the flushing means and the other following the passage into the lower trap and in a direction that will transfer its momentum to the contents in the said trap in such a construction as to carry them to the waste-pipe, thereby causing a lowering of the level in the pipe B with a corresponding vacuum in $a$, produced by the lowering of the water in B and the suction of the air through the opening N, which will in turn cause the trap C to siphon into the pipe B, and thus draw the contents of the bowl quickly in the pipe B until the seal in the bowl is broken. The deflecting projection O is arranged to properly divide the stream and prevent it from losing its force. I arrange over the opening N a suitable flange or guard N', which curves downwardly, guiding the water and soil past the aperture and preventing its clogging up.

What I claim as my invention is—

1. In a water-closet, the combination, with a single supply-pipe, of a bowl having two traps arranged one below the other, a communicating passage between the flushing means of the bowl and the supply-pipe and a passage between the supply-pipe and lower trap, a dividing deflector for the water directly below the supply-pipe for conducting the water into both passages, an opening at the lower end of the lower trap in line with the discharge, and an air-space between the two traps, substantially as described.

2. In a water-closet, a bowl having two traps arranged one above the other, a passage leading from the supply-pipe to the lower trap, an opening in the wall of the lower trap leading into the passage, and an inclined flange on the opening, substantially as described.

3. In a water-closet, the combination, with a single supply-pipe, of a bowl having two traps, passages leading from the supply-pipe to the flushing means and one of the traps, a dividing deflector at the bottom of the supply for conducting the water to the flushing means and a passage to the trap and an opening in the trap communicating with the passage.

In testimony whereof I affix my signature in presence of two witnesses.

JOHN H. HAMILTON.

Witnesses:
M. B. O'DOGHERTY,
P. M. HULBERT.